(12) United States Patent
Gerez et al.

(10) Patent No.: US 12,496,956 B2
(45) Date of Patent: Dec. 16, 2025

(54) SELECTIVE RETENTION SYSTEM

(71) Applicant: Adrian Steel Company, Adrian, MI (US)

(72) Inventors: Joshua Michael Gerez, Tecumseh, MI (US); Mark Anthoney Henry, Jr., Adrian, MI (US)

(73) Assignee: Adrian Steel Company, Adrian, MI (US)

( * ) Notice: Subject to any disclaimer, the term of this patent is extended or adjusted under 35 U.S.C. 154(b) by 589 days.

(21) Appl. No.: 17/935,194

(22) Filed: Sep. 26, 2022

(65) Prior Publication Data

US 2023/0127788 A1   Apr. 27, 2023

Related U.S. Application Data

(60) Provisional application No. 63/262,885, filed on Oct. 22, 2021.

(51) Int. Cl.
| | | |
|---|---|---|
| *B60P 7/08* | (2006.01) | |
| *A47B 96/06* | (2006.01) | |
| *B60P 7/10* | (2006.01) | |

(52) U.S. Cl.
CPC ............ *B60P 7/0815* (2013.01); *A47B 96/06* (2013.01); *B60P 7/10* (2013.01)

(58) Field of Classification Search
CPC .......... B60P 7/0815; B60P 7/10; B60P 3/007; B60P 3/14; A47B 96/06; A47B 96/04
See application file for complete search history.

(56) References Cited

U.S. PATENT DOCUMENTS

| | | | | |
|---|---|---|---|---|
| 870,993 | A | * 11/1907 | Richardson | ............ A47B 61/04 |
| | | | | 211/184 |
| 1,030,317 | A | 6/1912 | Middaugh | |
| 2,211,962 | A | 8/1940 | Morris | |
| 2,302,236 | A | 11/1942 | Mayne | |
| 2,516,122 | A | 7/1950 | Hughes | |
| 2,546,419 | A | 3/1951 | Ashley | |
| 2,768,047 | A | 10/1956 | Strauss | |
| 3,622,114 | A | 11/1971 | McIntire, Jr. | |
| D288,764 | S | 3/1987 | Moller | |
| 4,681,360 | A | * 7/1987 | Peters | ....................... B60P 1/00 |
| | | | | 414/522 |
| 4,775,058 | A | 10/1988 | Yatsko | |
| 4,824,158 | A | * 4/1989 | Peters | ....................... B60R 5/04 |
| | | | | 414/522 |

(Continued)

FOREIGN PATENT DOCUMENTS

| | | |
|---|---|---|
| CA | 3135060 A1 | 4/2022 |
| EP | 2933140 A2 | 10/2015 |

OTHER PUBLICATIONS

Canadian Inellectual Property Office, Office Action in Application No. CA3172532, dated Nov. 8, 2023, 6 pages.

(Continued)

*Primary Examiner* — Ko H Chan
(74) *Attorney, Agent, or Firm* — Marshall & Melhorn, LLC

(57) ABSTRACT

A selective retention system may have at least one side retention rail with an attachment portion and a retention portion. The retention portion may have a plurality of teeth. The system may also have an end retention rail with an attachment portion and a retention portion, where the retention portion at least one aperture.

18 Claims, 6 Drawing Sheets

(56) References Cited

U.S. PATENT DOCUMENTS

| | | |
|---|---|---|
| 5,139,375 A | 8/1992 | Franchuk |
| 7,516,704 B2 | 4/2009 | Snider et al. |
| 7,527,312 B1 | 5/2009 | Cucknell et al. |
| 7,641,253 B2 | 1/2010 | Steiger et al. |
| 7,784,885 B2 | 8/2010 | Steiger et al. |
| 7,984,886 B2 | 7/2011 | Lin |
| 8,413,825 B2 | 4/2013 | Spizman et al. |
| 10,207,172 B2 | 2/2019 | Hillson |
| 10,646,052 B2 | 5/2020 | Taylor et al. |
| 10,654,391 B2 * | 5/2020 | Greiner ............... B60P 7/13 |
| 10,773,632 B2 * | 9/2020 | Salter ................. B60P 3/00 |
| 11,547,516 B2 * | 1/2023 | Schaub ............... A61B 50/31 |
| 2005/0225108 A1 | 10/2005 | Panasewicz et al. |
| 2006/0131252 A1 | 6/2006 | Tobias |
| 2007/0080126 A1 | 4/2007 | Music |
| 2015/0320196 A1 | 11/2015 | Polizzi |
| 2016/0332735 A1 * | 11/2016 | Sodore ............. B64D 11/0696 |
| 2017/0166352 A1 | 6/2017 | Hoppe et al. |
| 2017/0210474 A1 * | 7/2017 | Pacheco ........... B64D 11/0696 |
| 2018/0178997 A1 * | 6/2018 | Burrell ................ B60R 9/06 |
| 2018/0229641 A1 * | 8/2018 | Ehrlich .............. B62D 33/046 |
| 2018/0326885 A1 * | 11/2018 | Greiner ............... B60P 7/13 |
| 2019/0283655 A1 * | 9/2019 | Salter ................. B60P 7/14 |
| 2020/0071073 A1 | 3/2020 | Kim |
| 2020/0147781 A1 | 5/2020 | Squiers et al. |
| 2020/0165036 A1 | 5/2020 | Squiers et al. |
| 2021/0045546 A1 | 2/2021 | Nagel et al. |

OTHER PUBLICATIONS

Canadian Intellectual Property Office, Examiner's Report in Application No. CA3172532, dated Feb. 17, 2025, 7 pages.

* cited by examiner

SELECTIVE RETENTION SYSTEM

FIELD

One embodiment of a selective retention system is provided. The system may be used for selectively retaining items on another structure.

BACKGROUND

It is known to add storage-type equipment to vehicles, such as utility and working vehicles, to adapt them to specific applications. For example, a trades-person may have a cargo-type van equipped with shelving, cabinets, drawers and other items designed to carry and store the various tools, equipment and parts needed for a general or particular task. The shelving, cabinets, drawers and other items might be broadly termed organizational applications. Various types of vehicles may be similarly adapted to accommodate the tools, equipment and parts for any number of trades or purposes.

A disadvantage associated these the current organizational applications is that they may not be adapted to adequately or appropriately store or retain items thereon. For example, while the prior art may include shelves, often items placed on a shelf in a vehicle will move during operation of the vehicle as the items have not been properly secured. This can result in the items not only becoming disorganized, but they may also be damaged, or damage the organizational applications, or the vehicle itself. Some known organizational applications might have dividers or other structures to compartmentalize the items, but often these dividers or structures are not sufficient to adequately or appropriately secure the items.

In view of the disadvantages associated with the prior art, it would be advantageous for an organizational application to have a structure that securely, but selectively, permits items to be located thereon.

SUMMARY

In one embodiment, a selective retention system may have at least one side retention rail comprising an attachment portion and a retention portion, wherein the retention portion has a plurality of teeth. The system may also have an end retention rail comprising an attachment portion and a retention portion, wherein the retention portion has at least one aperture.

In another embodiment, a selective retention system may have a first side retention rail and a second side retention rail. Each side retention rail may have an attachment portion, a retention portion and a transition portion connecting the attachment portion with the retention portion. Each retention portion may have a plurality of teeth.

In another embodiment, a selective retention system may have a first side retention rail and a second side retention rail. Each side retention rail may have an attachment portion, a retention portion and a transition portion connecting the attachment portion with the retention portion. The retention portion of the first side retention rail may have a first set of teeth. The retention portion of the second side retention rail may have a second set of teeth facing the first set of teeth. The system may have an end retention rail positioned at least partially between the first and second side retention rails. The end retention rail may have first and second transition portions extending from first and second attachment portions, respectively, to connect with a retention portion. The retention portion of the end retention rail may have an aperture. All the retention portions may be coplanar with one another.

BRIEF DESCRIPTION OF THE DRAWINGS

The advantages of the system will become readily apparent to those skilled in the art from the following detailed description when considered in the light of the accompanying drawings in which.

DETAILED DESCRIPTION

It is to be understood that the system may assume various alternative orientations and step sequences, except where expressly specified to the contrary. It is also to be understood that the specific systems and processes illustrated in the attached drawings, and described in the following specification are simply exemplary embodiments. Hence, specific dimensions, directions or other physical characteristics relating to the embodiments disclosed are not to be considered as limiting.

Figure 1:
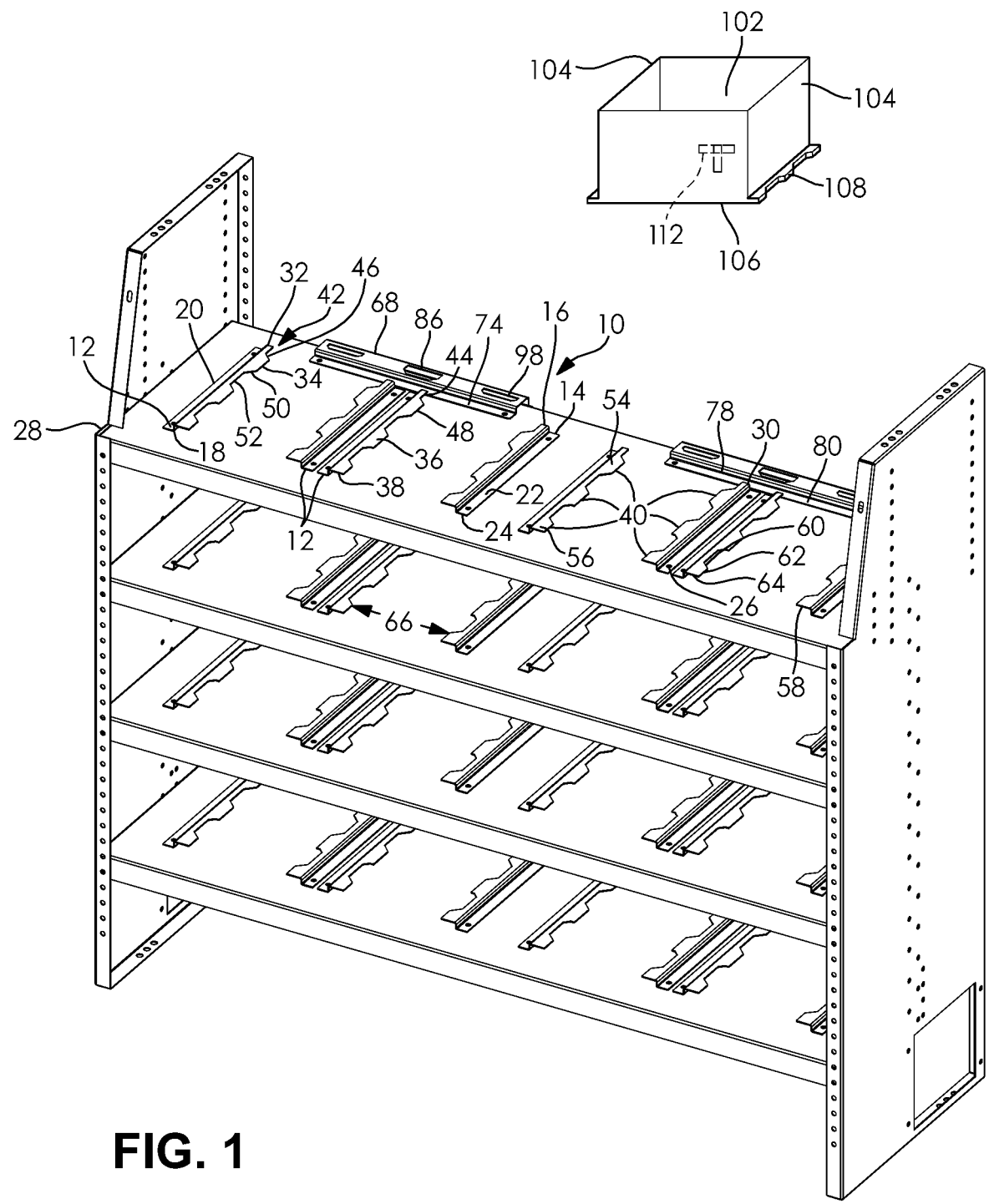
FIG. 1 is an upper, rear perspective view of one embodiment of a selective retention system on one embodiment of a shelf.
Figure 2:
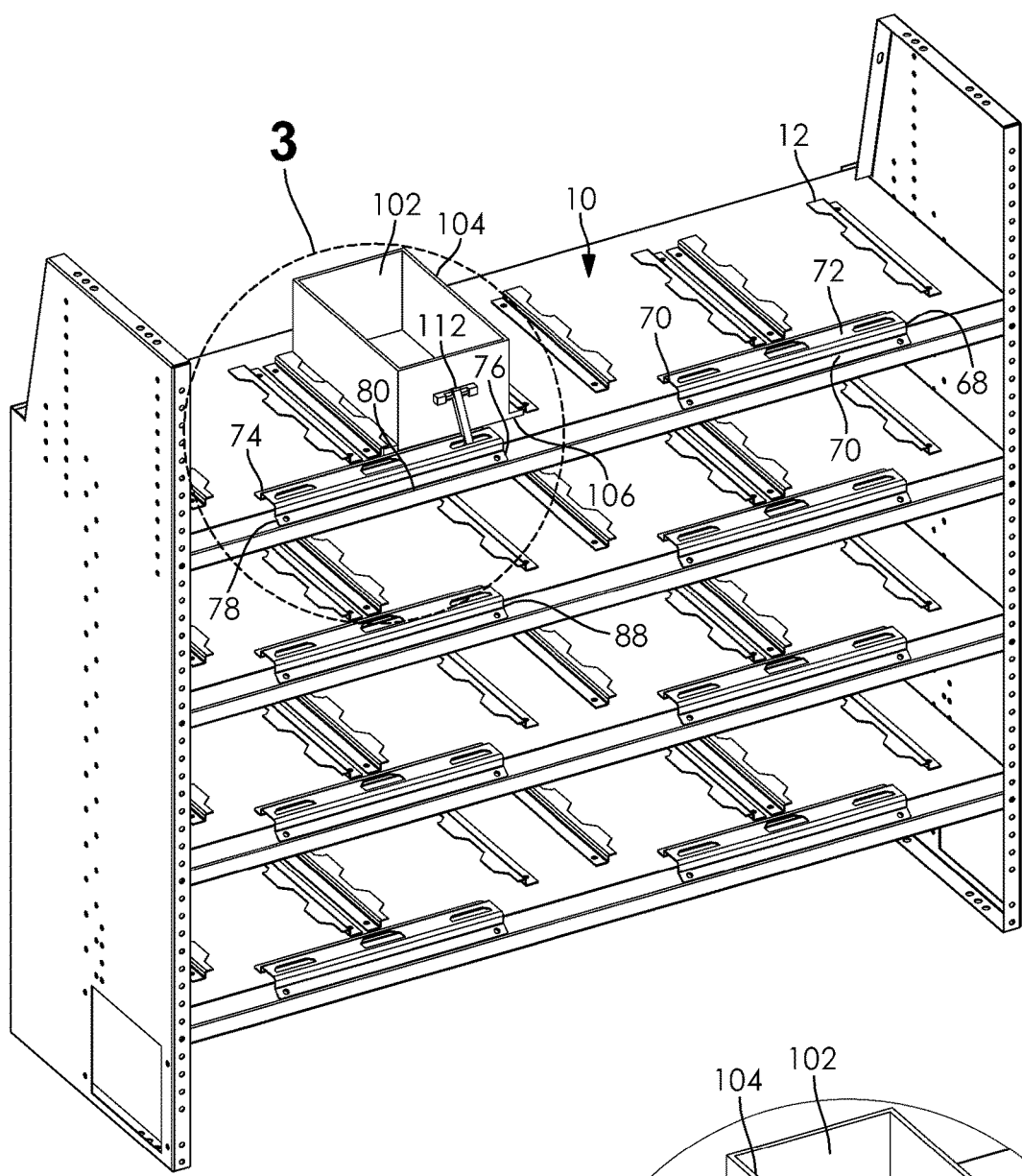
FIG. 2 is an upper, front perspective view of the embodiment from FIG. 1.
Figure 3:
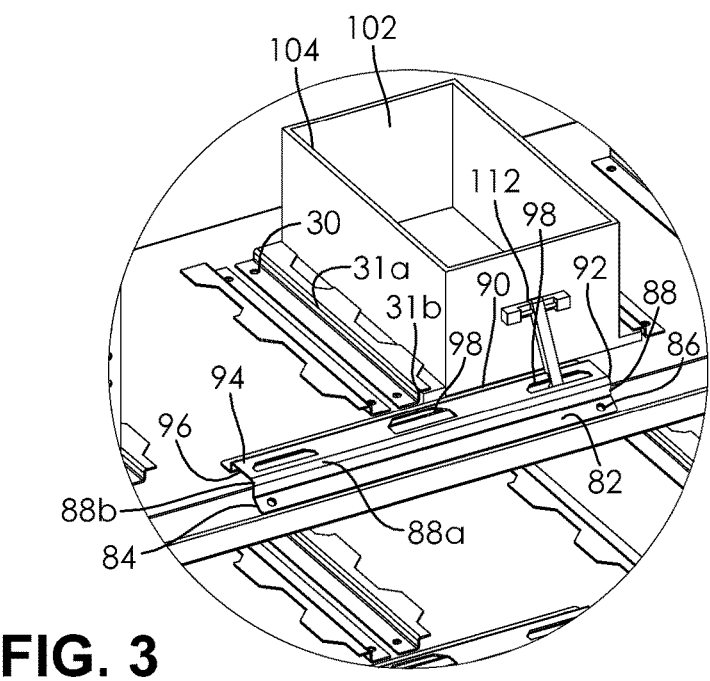
FIG. 3 is a detail of features in FIG. 2.

Turning now to FIGS. 1-3, one embodiment of a selective retention system 10 is depicted. The system 10 may have at least one side retention rail 12 comprising an attachment portion 14 and a retention portion 16. In some embodiments, the attachment portion 14 may be a length of material, which may be plate-like in its construction, that extends along the side retention rail 12. The attachment portion 14 may extend along the entire length of the side retention rail 12, or only a portion thereof. In some embodiments, the length of the attachment portion 14 may be greater than a width of the attachment portion 14. It may be that the attachment portion 14 has a substantially constant width along its length. The width may be defined between an inner edge 18 and an outer edge 20. In other embodiments, the width of the attachment portion 14 may vary.

The attachment portion 14 may have an upper surface 22 and a lower surface 24, where the two surfaces 22, 24 may be separated by a substantially constant thickness. The upper and lower surfaces 22, 24 may be substantially planar which may contribute to its plate-like construction. The attachment portion 14 may exist substantially in a single, first plane. Further, in some embodiments, the attachment portion 14 may have a substantially rectangular shape, although other shapes may be used.

At least one aperture 26 may be located in the attachment portion 14. The at least one aperture 26 extends from the upper surface 22 to the lower surface 24. In some embodiments, two apertures 26 are provided along the length of the attachment portion 14. The apertures 26 may be adapted to receive mechanical fasteners therethrough to connect the attachment portion 14 to a substrate 28. Apertures 26, however, are not required as the attachment portion 14 may be connected to the substrate 28 through other structures or devices, including but not limited to welding and/or adhesives.

In some embodiments, the apertures 26 may be located in end portions of the attachment portion 14. It may be that except for the apertures 26, the attachment portion 14 extends continuously without interruption between the end portions. Some embodiments may have the attachment portion 14 as a uniform, integrally formed and one-piece structure.

The attachment portion 14 may be connected to the retention portion 16 by a transition portion 30. In some embodiments, the transition portion 30 may extend along, and perhaps be formed from or with, the inner edge 18 of the attachment portion 14. The transition portion 30 may extend the length of the attachment portion 14 or only a portion thereof. All, or a portion, of the transition portion 30 may be angled with respect to the attachment portion 14, such as at an angle of between approximately 45-90 degrees. The transition portion 30 may extend upwardly and outwardly from the first plane of the attachment portion 14.

The transition portion 30 may have a constant width as it extends along the attachment portion 14. Further, in some embodiments, the transition portion 30 may extend continuously without interruption along its length. The transition portion 30 may be generally rectangular in shape and be uniform, integrally formed and one-piece in its construction. The transition portion 30 may also have a substantially constant thickness along its length defined between an upper surface 31*a* and a lower surface 31*b*. The upper and lower surfaces 31*a*, 31*b* may be substantially planar.

The retention portion 16 may have an inner edge 32 and an outer edge 34. The inner edge 32 may extend along, in whole or in part, the transition portion 30. The retention portion 16 may have an upper and a lower surface 36, 38 that define a constant thickness between them. The upper and lower surfaces 36, 38 may be substantially planar. The retention portion 16 may exist substantially in a single, second plane.

In some embodiments, the retention portion 16 may extend parallel to, but not be coplanar with, the attachment portion 14. In these embodiments, the second plane may be located above the first plane. It may be that in some cases, the retention portion 16 does not overlap, such as vertically overlap, with the attachment portion 16.

The outer edge 34 of the retention portion 16 may have a plurality of teeth 40. The teeth 40 may cause the width of the retention portion 16 to vary along the length of the retention portion 16. The teeth 40 may be co-planar with the retention portion 16 and they may be unitary, one-piece and integrally formed with the retention portion 16. The teeth 40 may extend along the entire length of the retention portion 16 or any portion thereof.

In one embodiment, the teeth 40 may be formed in whole or in part by a leading edge portion 42 of the retention portion 16 that may have a reduced width area 44. A first ramp 46 may extend from the reduce width area 44 at an angle away from the inner edge 32. The angle may be such as about 30-60 degrees. The first ramp 46 may transition to a plateau area 48. The plateau area 48 may be substantially linear; the plateau area 48 may extend parallel the reduced width area 44. The reduced width area 44 may have a width that is smaller than the width of the plateau area 48.

The plateau area 48 may transition to a second ramp 50. The second ramp 50 may be angled toward the inner edge 32 such at about 30-60 degrees. The angle and/or length of the second ramp 50 may be the same or different than the first ramp 46.

The first ramp 46, plateau portion 48 and the second ramp 50 may form one tooth of the plurality of teeth 40. Other teeth designs may be used. For example, teeth of other shapes and sizes may be used. In one example, the leading edge portion 42 may be removed.

The second ramp 50 may transition to a valley portion 52. The valley portion 52 may extend in a substantially linear fashion, and be parallel the leading edge portion 42 and/or the plateau area 48. The valley portion 52 may extend along the length of the retention portion 16 approximately the same length as the plateau area 48. The valley portion 52 may be substantially the same width as the reduced width area 44.

The valley portion 52 may separate a first tooth 54 from one or more additional teeth 40 in the retention portion 16. The teeth 40 may be the same, substantially the same or they may be different in size and shape.

In some embodiments, a final tooth 56, located adjacent a trailing edge portion 58, and opposite the leading edge portion 42, may be provided in the retention portion 16. The final tooth 56 may be provided with a first ramp 60, which may transition to a plateau portion 62. In some embodiments, the plateau portion 62 may transition to a rear wall 64 of the retention portion 16. The rear wall 64 may extend substantially transverse the length of the retention portion 16. The plateau portion 62 of the final tooth 56 may have the same or substantially the same width as the plateau areas 48 of the first tooth 54.

The attachment portion 14, the transition portion 30 and the retention portion 16 may be unitary, one piece and integrally formed, or these individual portions 14, 30 and 16 may be separately formed and then joined together such as by welding or with mechanical fasteners.

The attachment portion 14, the transition portion 30 and the retention portion 16 may be constructed of the same or different materials. In one embodiment, each of the portions 14, 16, 30 may be constructed of stamped metal, but composite materials, fiberglass, wood, and/or plastic materials may be used for all or parts of the portions 14, 30, 16.

One or more side retention rails 12 may be provided on the substrate 28, such as on an organizational application. In some embodiments, the side retention rails 12 may be provided in pairs. While a pair of rails 12 is mentioned, it may be that a single rail 12 maybe used to secure a structure to the substrate 28. In these embodiments, the same or similar side retention rails 12 may be located on the substrate 28 spaced apart from one another so that the outer edges 34 of the retention portions 16 face one another. It may be that the teeth 40, which may include the final teeth 56, on the outer edges 34 of a side retention rail 12 pair are at least generally aligned with one another. In such an alignment, the teeth 40 may be co-planar and located generally across from one another on the substrate 28. The respective teeth 56 of the side retention rails 12 may be separated by a gap 66. The dimension of the gap 66 may be varied according to the width of a structure to fit therein.

The system 10 may also comprise at least one end retention rail 68 having at least one attachment portion 70 and a retention portion 72. In some embodiments, an end retention rail 68 may have a first and a second attachment portion 74, 76 located on either side of the retention portion 70.

The end retention rail 68 may be constructed of the same or different materials. In one embodiment, the end retention rail 68 may be constructed of stamped metal, but composite materials, fiberglass, wood, and/or plastic materials may be used for all or parts of the rail 68. The rail may be one-piece, unitary and integrally formed or it may be comprised of several pieces that have been joined together.

Each attachment portion 74, 76 may be a length of material, which may be plate-like in its construction, that extends along the end retention rail 68. The attachment portions 74, 76 may extend along the entire length of the end retention rail 68, or only a portion thereof. In some embodiments, the individual lengths of the attachment portions 74, 76 may be greater than an overall width of the attachment portions 74, 76. It may be that the attachment portions 74, 76 have a substantially constant width along their lengths. Each attachment portion 74, 76 may have an inner edge 78 and an outer edge 80.

The attachment portions 74, 76 may each have an upper surface 82 and a lower surface 84, where the two surfaces 82, 84 may be separated by a substantially constant thickness. The upper and lower surfaces 82, 84 may be substantially planar which may contribute to the plate-like construction of the attachment portions 74, 76. The attachment portions 74, 76 may both exist substantially in the single, first plane. Both attachment portions 74, 76 may also individually define a substantially rectangular shape.

At least one aperture 86 may be located in each attachment portion 74, 76. The at least one aperture 86 extends from the upper surface 82 to the lower surface 84. In some embodiments, two apertures 86 are provided along the length of each attachment portion 70. The apertures 86 may be adapted to receive mechanical fasteners therethrough to connect the attachment portions 74, 76 to the substrate 28. Apertures 86, however, are not required as the attachment portions 74, 76 may be connected to the substrate 28 through other structures or devices, such as through welding and/or adhesives. The apertures 86 may be located in end portions of the attachment portions 74, 86.

Each attachment portion 70 may be connected to the retention portion 72 by a transition portion 88. In some embodiments, the transition portions 88 may extend along, and perhaps be formed from or with, the inner edges 78 of the attachment portion 74, 76. The transition portions 88 may extend the lengths of the attachment portions 74, 76 or only a portion thereof. The transition portions 88 may be angled with respect to the attachment portions 74, 76, such as at an angle of between approximately 45-90 degrees.

The transition portions 88 may have a constant width as they extend along the attachment portions 74, 76. Further, in some embodiments, the transition portions 88 may extend continuously without interruption along their lengths. The transition portions 88 may be generally rectangular in shape and be uniform, integrally formed and one-piece in their construction. The transition portions 88 may also have a substantially constant thickness along their length defined between an upper surface 88a and a lower surface 88b. The upper and lower surfaces 88a, 88b may be substantially planar.

The retention portion 72 may have first and second edges 90, 92. Each edge 90, 92 may extend along, in whole or in part, to the transition portions 88. The retention portion 72 may have an upper and a lower surface 94, 96 that defined a constant thickness between them. The upper and lower surfaces 94, 96 may be substantially planar. The retention portion 72 may exist substantially in the single, second plane.

In some embodiments, the retention portion 72 may extend parallel to, but not be coplanar with, the attachment portions 70. In these embodiments, the second plane may be located above the first plane. In may be that in some cases, the retention portion 72 does not overlap with the attachment portions 70.

In some embodiments, the retention portion 72 of the end retention rail 68 may be coplanar with the retention portion 16 of at least one side retention rail 12. In other embodiments, the retention portion 72 of the end retention rail 68 may be coplanar with all of the retention portions 16 of the side retention rails 12 of the system 10 such that they reside in the second planes. In these embodiments, it may be that the attachment portions 70 of the end retention rail(s) 68 are coplanar with the attachment portions 14 of the side retention rail 12 such that they reside in the first plane.

Some embodiments locate at least one aperture 98 in the retention portion 72 of the end retention rail 68. In other embodiments, there may be more than one aperture 98 in the retention portion 72 of the retention rail 68. The apertures 98 may be oval or rectangular shaped apertures and may have a length greater than their width. In some embodiments, the apertures 98 may form a generally trapezoidal shape. These apertures may extend through the retention portion 72 or they may simply be depressions in the retention portion 72 surfaces.

Figure 4:
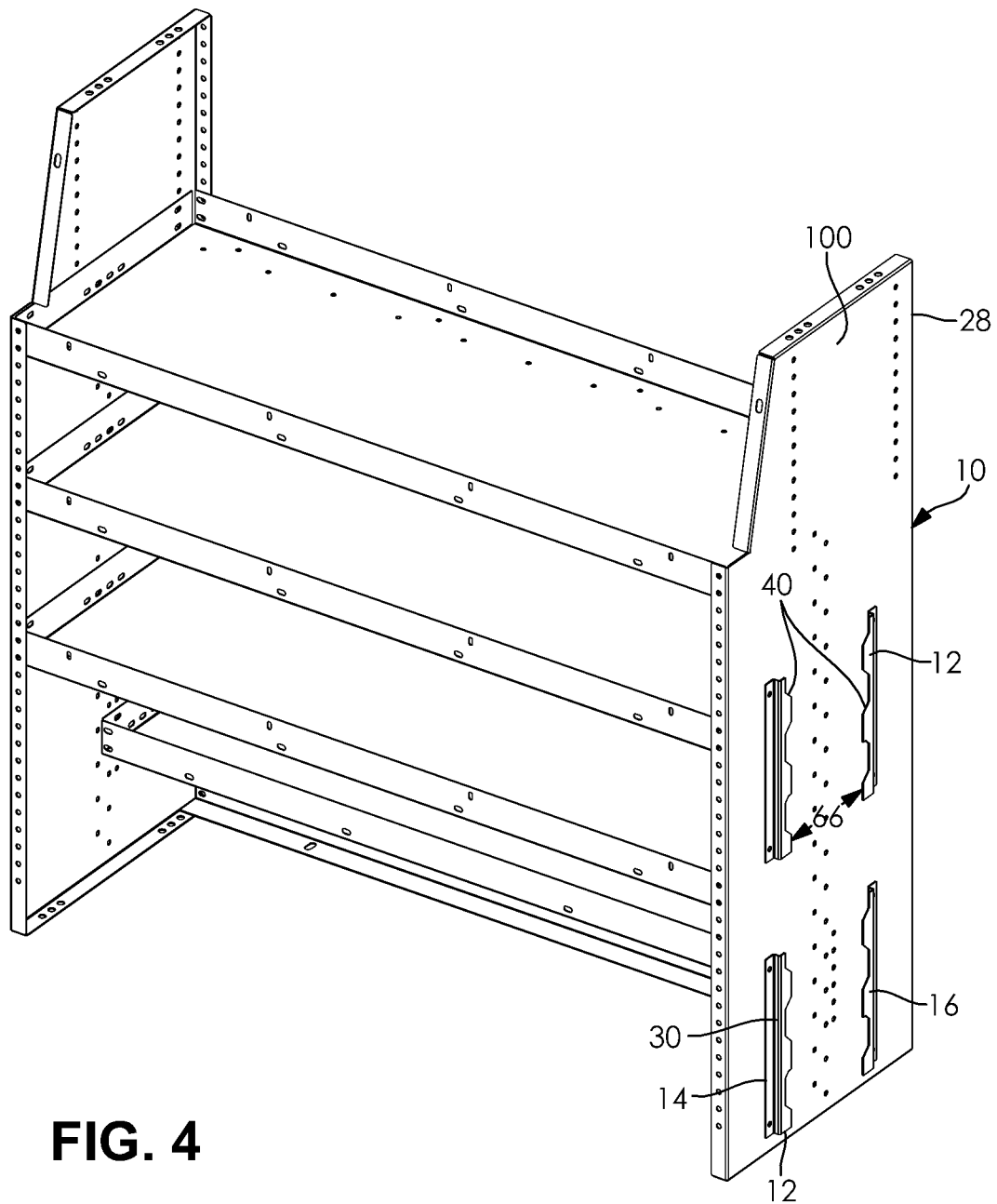
FIG. 4 depicts another embodiment of a selective retention system on another shelf surface.

FIGS. 1-3 depict the side retention rails 12 and the end retention rails 68 on a substantially horizontally oriented substrate 28, such as a shelf member. FIG. 4 demonstrates that the side retention rails 12 may be located on other substrates 28, such as angled substrates 28. In the depicted embodiment, the side retention rails 12 may be located on a vertical wall 100 of the shelf. One or more end retention rails (not shown) may accompany the side retention rails 12 in a location and orientation that is the same or similar to that depicted in FIGS. 1-3.

In some embodiments, a device 102, such as but not limited to a container, may be selectively retained by at least one side retention rail 12. In some cases, two side retention rails 12 may be used and in yet other cases an end retention rail 68 may be used as well. The sides 104, or perhaps a bottom surface 106, of the device 102 may have a complementary shape to at least some of the features noted above for the side retention rails 12 and/or the end retention rail 68. By way of one example, the sides 104 and/or bottom surface 106 of the device 102 may have complementary shaped teeth 108 and valleys 110 that engage with one or more teeth 40 and/or valley portions 52 of the side retention rails 12. In some embodiments, the device 102 may have a latch, clip, and/or biasing member 112 that may selectively engage with one or more of the apertures 98 in the retention portion 72 of the end retention rail 68. The latch, clip and/or biasing member 112 may selectively extend into the aperture 98 and engage with the retention portion 72 to selectively retain the device 102 to the end retention rail 68 and/or side retention rail(s) 12.

Figure 5:
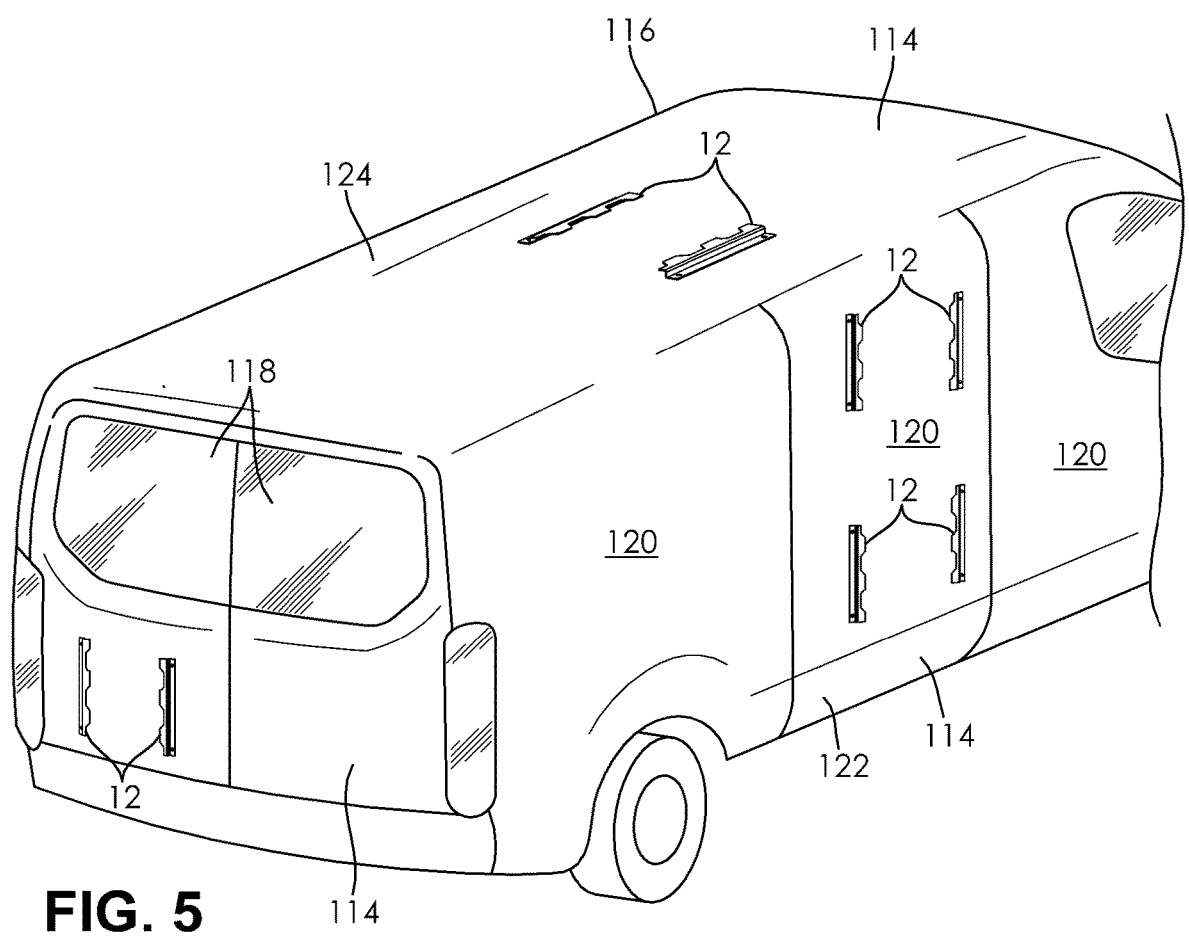
FIG. 5 depicts another embodiment of a selective retention system on various vehicle exterior surfaces.

FIG. 5 depicts one embodiment where the side retention rails 12 have been attached to another substrate 28, in this case various outside surfaces 114 of a vehicle 116. By way of example, one such surface 114 may be comprised of the rear doors 118 of a cargo vehicle 116. The rails 12 are shown attached to the rear doors 118 in one orientation and location on the rear doors 118, but other locations and orientations are permissible. Further, while doors 118 are shown on the rear of the vehicle 116, if the vehicle 116 does not have doors 118, the rails 12 can be attached to any rear surface. The rails 12 may be attached to the vehicle 116 in the same or similar manner as discussed above.

In one embodiment, the rails 12 may be oriented at an angle other than substantially vertically. In these embodiments, the rails 12 may be oriented between approximately 0 and approximately 180 degrees from their depicted orientation. Further, while only a single pair of rails 12 are depicted, additional rails are permissible. Further yet, an end retention rail 68 may be used with none, some or all of the rails 12 as described above. The rails 12 and/or 68 may be used to secure one or more devices 102 in the same or similar manner as noted above.

FIG. 5 also depicts rails 12 on an exterior side wall 120 of the vehicle 116. The vehicle 116 in this embodiment may have side doors 122, as shown, but the rails 12 may be attached to any exterior side wall 120 whether comprised of doors 122 or without doors. The rails 12 may be attached to the side wall 120 as noted above with the same allowance for number, orientation, and/or use with the end retention rail 68 etc. as noted above.

FIG. 5 depicts two pairs of rails 12 on the exterior side wall 120 of the vehicle. The rail pairs are depicted as laterally aligned with one another on the wall 120, however, other orientations are permissible. By way of example, a first pair of rails 12 may be primarily vertically oriented, while a second pair of rails 12 may be oriented transversely with respect to the first pair of rails 12. The rails 12 and/or 68 may be used to secure one or more devices 102 in the same or similar manner as noted above.

FIG. 5 also depicts a pair of rails 12 on an upper exterior surface of the vehicle 114, such as the roof 124. The rails 12 are shown attached to the roof 124 in one orientation and location on the roof 124, but other locations, numbers and orientations are permissible. For example, there may be more than one pair of rails 12 and the rails 12 may or may not be aligned with one another along the roof 124. The rails 12 may be attached to the vehicle 116 in the same or similar manner as discussed above including use of the end retention rail 68 or not. The rails 12 may be used as noted above.

Figure 6:
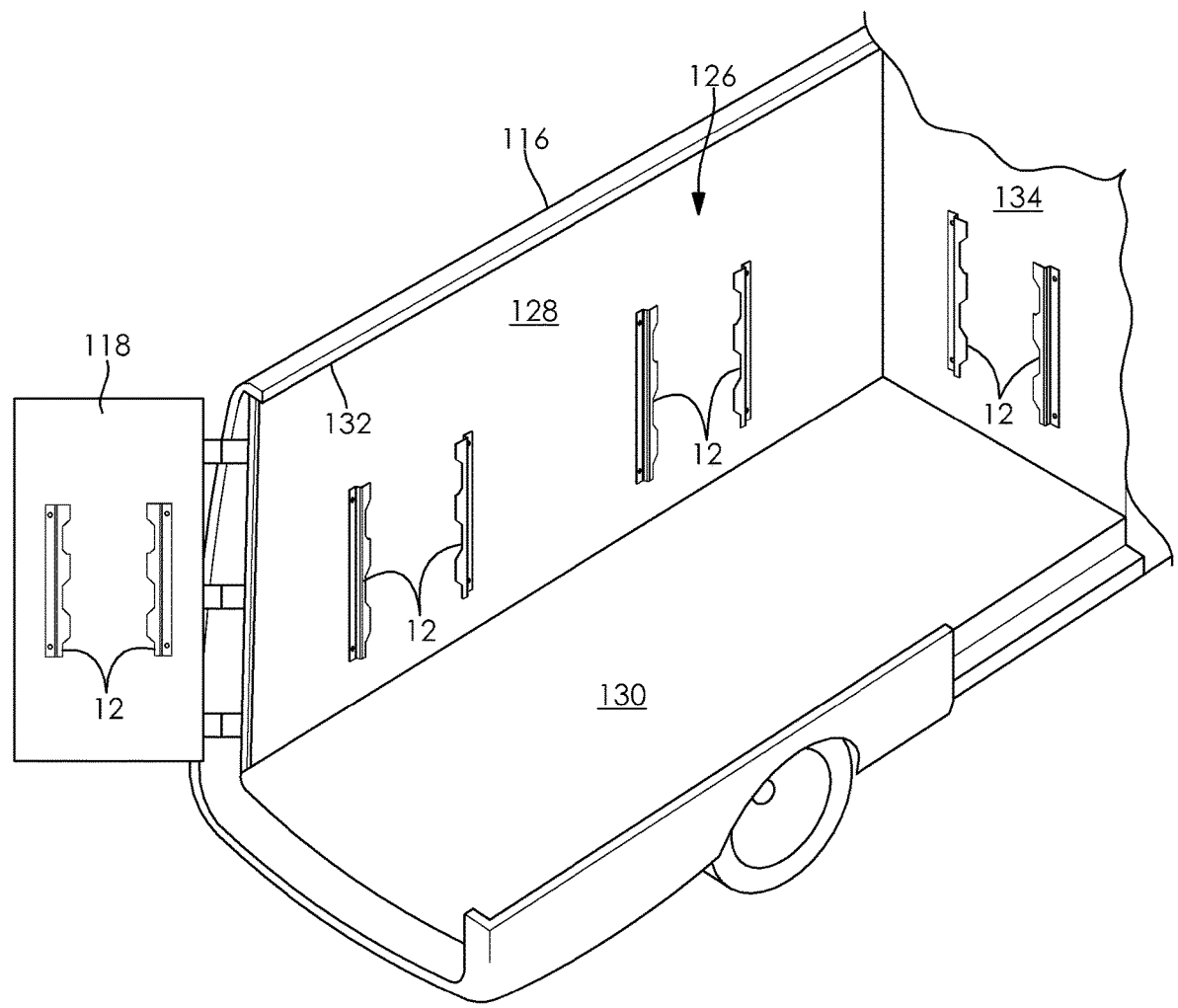
FIG. 6 depicts another embodiment of a selective retention system on various vehicle interior surfaces.
Figure 7:
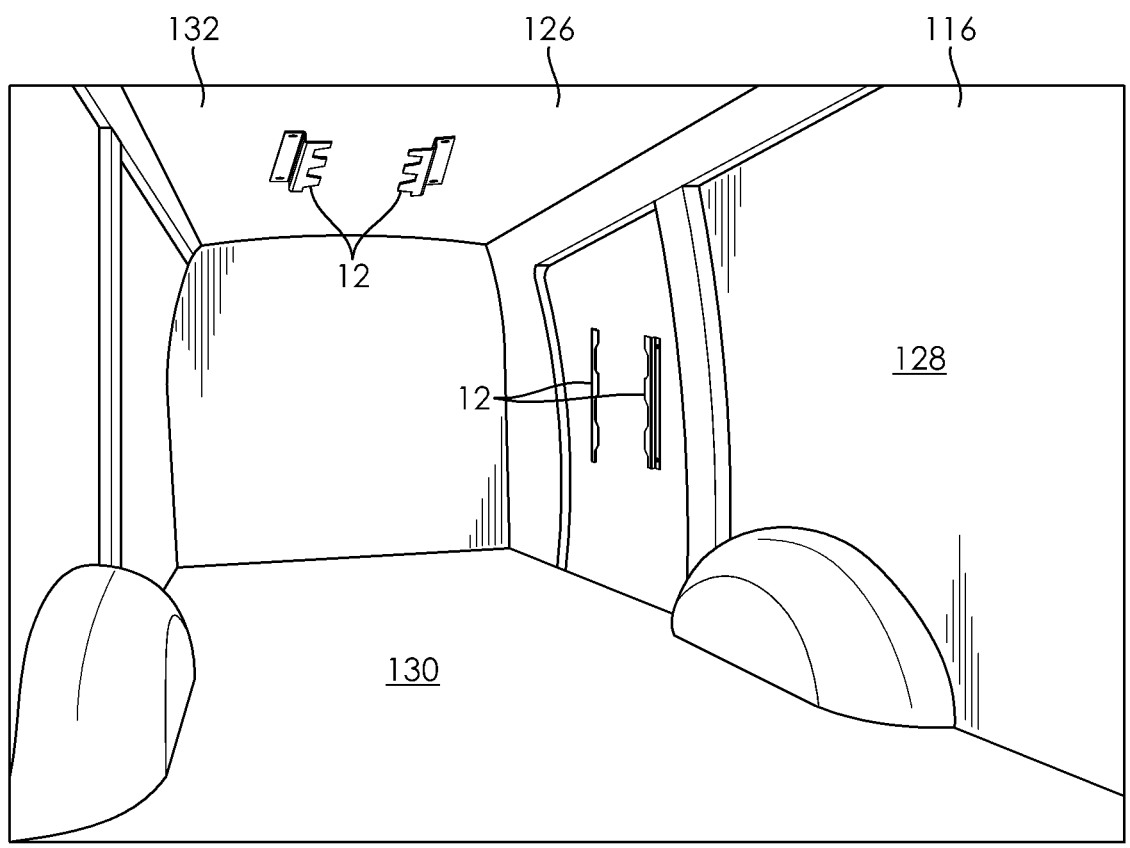
FIG. 7 depicts another embodiment of a selective retention system on various vehicle interior surfaces.

FIGS. 6 and 7 depicts one embodiment of a vehicle interior 126, such as a cargo portion of a vehicle interior. The interior may be defined by the side walls 128, doors, such as rear doors 118 and/or side doors, floor 130, roof 132 and/or partitions 132.

In one embodiment, one or more pairs of rails 12 may be attached to the interior side wall 128 in the same or similar manner as described above. Further, the end retention rails 68 may or may not be used with the rails 12. The rails 12 are depicted laterally offset from one another, but the rails 12 may be located at any position, orientation or number on the side wall 128 with respect to one another. The rails 12 and/or 68 may be used to secure one or more devices 102 in the same or similar manner as noted above.

FIG. 6 also depicts the optional situation where a pair of rails 12 may be located on a partition 134 separating the cargo area from the driver's area. A generic partition 134 is depicted and the partition 134 may of any size, shape or orientation in the vehicle.

In the depicted embodiment, a single pair of rails 12 is shown in the partition 134. While a single pair is shown, the additional pairs may be included at any position, orientation and number. This is true for any of the depicted embodiments. The rails 12 may be attached to the partition 134 as described above to function also as noted above. The rails 12 and/or 68 may be used to secure one or more devices 102 in the same or similar manner as noted above.

Rails 12 may also be attached to the interior surface of the roof, as depicted in FIG. 7, in any number, location and/or orientation. The same figure shows one embodiment of rails 12 being attached to an interior surface of a door of the cargo area.

Rails 12 may also be attached to the floor 130 of the vehicle 116 in any number, orientation and position. Additionally, or alternatively, the organizational applications may be attached to the floor 130, or the walls, and/or the partition 134, and the rails 12 can be attached to the applications as noted above.

Further, versions of organizational applications are depicted in FIGS. 1-7, other applications with rails 12 and/or 68 may be used therewith. For example, the rails 12 and/or 68 may be used with drawers (including floor drawers), cabinets (including file cabinets), ladder racks, bins, consoles, dividers, door kits, door storage devices, tank storage, toolboxes and/or window screens. The rails 12/68 may be used in any number, orientation and/or position with, on and/or in any of these applications including where multiple applications are located in the same vehicle. The rails 12 and/or 68 may be used to secure one or more devices 102 in the same or similar manner as noted above.

From the foregoing, it can be appreciated that a system for selectively but securely storing devices 102 and the like on an organizational application is provided. The system temporarily secures items to an organization application so that the items remain in their placed condition and location until they are intentionally removed therefrom. Namely, the side retention rails 12 secure the container 102 laterally while the end retention rail 68 secures the container 102 front to back (or up and down). This is true regardless of the orientation of the system, such as when it is oriented substantially horizontally, substantially vertically and at any angle in between. And, when it is desired to remove the device 102, the system permits for its quick and easy removal.

FIGS. 1-4 depict one embodiment of an organizational application, such as a shelf. While a shelf of one size and shape, having certain features, is depicted in FIGS. 1-4, other shelves may be used. By way of example only, shelving units may have shelves of other heights, widths, number of shelves and different end panel shapes, sizes and designs including no end panels.

In accordance with the provisions of the patent statutes, the present device has been described in what is considered to represent its preferred embodiments. However, it should be noted that the device can be practiced otherwise than as specifically illustrated and described without departing from its spirit or scope.

What is claimed is:

1. A selective retention system, comprising:
   at least one side retention rail comprising an attachment portion and a retention portion, wherein the retention portion has a plurality of teeth; and
   an end retention rail comprising at least one attachment portion and a retention portion, wherein the retention portion has at least one aperture,
   wherein a transition portion of the end retention rail locates the retention portion of the end retention rail in a parallel but non-planar orientation with the at least one attachment portion of the end retention rail.

2. The system of claim 1, wherein the at least one side retention rail comprises a first side retention rail and a second side retention rail, wherein the first side retention rail and the second side retention rail make up a pair, each rail having a plurality of teeth directed toward one another, wherein said side retention rails are separated from one another by a gap.

3. The system of claim 2, wherein teeth opposite one another on said side retention rails are substantially the same shape and size as one another.

4. The system of claim 2, wherein at least one tooth in said plurality of teeth on each side retention rail is comprised of a first ramp portion, a planar plateau portion, and a second ramp portion.

5. The system of claim 2, wherein the teeth in each of said plurality of teeth on each side retention rail are separated by valleys.

6. The system of claim 1, wherein a transition portion of the at least one side retention rail locates the retention portion of the at least one side retention rails in a parallel but non-planar orientation with the attachment portion of the at least one side retention rails.

7. The system of claim 1, wherein the retention portion of the end retention rail is located between two attachment portions of the end retention rail.

8. The system of claim 1, wherein the retention portion of the end retention rail has a plurality of apertures.

9. The system of claim 1, wherein the end retention rail is located at least partially between two side retention rails and extends generally transverse with respect to the side retention rails.

10. A selective retention system, comprising:
a first side retention rail and a second side retention rail, wherein each side retention rail has an attachment portion, a retention portion and a transition portion connecting the attachment portion with the retention portion,
wherein each retention portion has a plurality of teeth,
an end retention rail comprising at least one attachment portion and a retention portion,
wherein a transition portion of the end retention rail locates the retention portion of the end retention rail in a parallel but non-planar orientation with the at least one attachment portion of the end retention rail.

11. The selective retention system of claim 10, wherein said attachment portions of said side retention rails are coplanar with one another on a first plane, and said retention portions of said side retention rails are coplanar with one another on a second plane different from the first plane.

12. The selective retention system of claim 11, wherein the retention portion of the end retention rail is located between first and second attachment portions of the at least one attachment portion of the end retention rail.

13. The selective retention system of claim 12, wherein said retention portion of said end retention rail is coplanar with said retention portions of said side retention rails and said first and second attachment portions of said end retention rail are coplanar with the attachment portions of the side retention rails.

14. The selective retention system of claim 12, wherein said end retention rail, and said first and second side retention rails are each unitary, one piece and integrally formed.

15. The selective retention system of claim 12, wherein said plurality of teeth of said retention portion on each side retention rail are adapted to selectively engage with complementary teeth on a container and wherein an aperture in said retention portion of said end retention rail selectively receives a portion of a latch from said container.

16. The selective retention system of claim 12, wherein said end retention rail is oriented transversely to first and second side retention rails.

17. The selective retention system of claim 10, wherein the retention portions of said first and second side retention rails are cantilevered from said transition portions.

18. A selective retention system, comprising:
a first side retention rail and a second side retention rail, wherein each side retention rail has an attachment portion, a retention portion and a transition portion connecting the attachment portion with the retention portion,
wherein the retention portion of said first side retention rail has a first set of teeth,
wherein the retention portion of the second side retention rail has a second set of teeth facing the first set of teeth,
an end retention rail positioned at least partially between the first and second side retention rails, said end retention rail having first and second transition portions extending from first and second attachment portions, respectively, to connect with a retention portion, wherein said retention portion of said end retention rail has an aperture,
wherein all of the retention portions are coplanar with one another.

* * * * *